US012476384B2

(12) United States Patent
Snygg et al.

(10) Patent No.: US 12,476,384 B2
(45) Date of Patent: Nov. 18, 2025

(54) PACKAGING FOR ANTENNA ARRAYS

(71) Applicant: Telefonaktiebolaget LM Ericsson (publ), Stockholm (SE)

(72) Inventors: Göran Snygg, Partille (SE); Ingmar Andersson, Lindome (SE); Kim Nordqvist, Västra Frölunda (SE); Ola Tageman, Gothenburg (SE); Anders Martinsson, Gothenburg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 161 days.

(21) Appl. No.: 18/279,847

(22) PCT Filed: Mar. 8, 2021

(86) PCT No.: PCT/EP2021/055727
§ 371 (c)(1),
(2) Date: Aug. 31, 2023

(87) PCT Pub. No.: WO2022/188941
PCT Pub. Date: Sep. 15, 2022

(65) Prior Publication Data
US 2024/0162626 A1 May 16, 2024

(51) Int. Cl.
*H01Q 21/06* (2006.01)
*H01Q 1/22* (2006.01)

(52) U.S. Cl.
CPC ......... *H01Q 21/062* (2013.01); *H01Q 1/2283* (2013.01); *H01Q 21/064* (2013.01); *H01Q 21/065* (2013.01)

(58) Field of Classification Search
CPC .. H01Q 21/062; H01Q 1/2283; H01Q 21/064; H01Q 21/065; H01Q 1/02
See application file for complete search history.

(56) References Cited

U.S. PATENT DOCUMENTS 11,069,988 B1 7/2021 Huang et al.
2009/0231225 A1* 9/2009 Choudhury ............ H01Q 25/00 343/893
(Continued)

FOREIGN PATENT DOCUMENTS

CN 111509383 A 8/2020
JP 2011211424 A 10/2011

OTHER PUBLICATIONS

International Search Report and Written Opinion of the International Searching Authority, PCT/EP2021/055727, mailed Nov. 24, 2021, 10 pages.

*Primary Examiner* — Renan Luque
(74) *Attorney, Agent, or Firm* — Sage Patent Group

(57) ABSTRACT

The present invention relates to an integrated antenna unit assembly and antenna arrays and antenna packages including the antenna unit assembly. The antenna unit assembly includes a carrier structure, one or more antenna element(s) arranged on a surface of a first edge part of the carrier structure. The integrated antenna unit assembly further includes an integrated circuit (IC) arrangement including one or more circuits mounted on a first surface of a first side of the carrier structure. Further, a first dielectric element mounted on a second surface of the first side of the carrier structure and coupling means arranged to electrically couple the IC to the first dielectric element are also included. The carrier structure of the integrated antenna unit assembly includes a second edge part adapted to be surface mounted on a surface of a second dielectric element.

13 Claims, 6 Drawing Sheets

(56) References Cited

U.S. PATENT DOCUMENTS

| | | | |
|---|---|---|---|
| 2018/0351262 A1 | 12/2018 | Yoon et al. | |
| 2019/0057944 A1 | 2/2019 | So et al. | |
| 2021/0066206 A1* | 3/2021 | Oh | H01L 25/105 |

* cited by examiner

PACKAGING FOR ANTENNA ARRAYS

CROSS REFERENCE TO RELATED APPLICATIONS

This application is a 35 U.S.C. § 371 national stage application of PCT International Application No. PCT/EP2021/055727 filed on Mar. 8, 2021, the disclosure and content of which is incorporated by reference herein in its entirety.

TECHNICAL FIELD

The present disclosure relates to packaging of antenna elements and in particular to packaging of an integrated antenna as well as antenna arrays for wireless communication networks.

BACKGROUND

There is a general demand in increased data capacity in the digital communication networks globally. Today many 5G networks use phased arrays, but there are also solutions for 4G. The trend is that the arrays are getting bigger and bigger with an increased number of antenna elements; for future 6G networks there are discussions about arrays with more than 1000 antenna elements. Due to lack of bandwidth there is also a desire to use higher and higher frequencies. 5G is already today using for example 28 GHz and 39 GHz, and 47 GHz and possibly higher bands are considered as well. For 6G, frequencies around and above 100 GHz are considered.

To limit the number of antennas in the networks, a relative high beam steering is considered. Beam steering in azimuth ±60° is likely. This will require a small element-to-element distance to avoid so called grating lobes, and with ±60° beam steering in azimuth, an element distance of about a half wavelength is needed. In elevation, however, the beam steering is limited to +/−15° in many use cases, thus relaxing the element-to-element distance somewhat.

There is a desire to lower the cost, resulting in that it becomes more and more common to integrate the antenna elements into packages and other types of subarray antennas that are combined to bigger arrays.

Similar challenges exist in the backhaul network and to some degree even worse, as traditional backhaul frequencies are moved to 5G and 6G applications, leading to increased backhaul frequencies. Higher frequencies, e.g. f>70 GHz, in backhaul generally results in narrower antenna lobes which will make it more challenging to install the antenna and to keep the antenna steady. Most likely some type of beam tracking will be needed in the future for high gain high frequency backhaul networks. By having a small array feeding a parabolic antenna, some beam adjustment could be done during installation as well as during operation.

There are some major obstacles in designing integrated sub-array antennas today which make the realization of cost-efficient and high-performance integrated antenna array packaging ever more challenging.

It is difficult to scale existing solutions up in frequency. The physical distance between the elements gets smaller and smaller with increasing frequencies. Existing integrated circuits (IC) are more or less fixed in size and do not scale similarly with frequency which in turn causes integration space problems. Further, removal of the dissipated power from the IC is a growing challenge as the antenna elements are positioned on one side of the board/panel and the IC dies on the opposite side. Thus, the routing becomes more and more difficult and complex when more elements are added which results in thicker boards/panels and substantially increased losses when the radio frequency (RF) signals should be routed from the IC through the carrier board to the antenna elements. Additionally, co-existence of different services like Fixed services, EESS, Satcom, etc. places stringent requirements on the out-of-band emission levels. This requires antenna filters to reduce these levels. Current solutions do not allow for inclusion of such high-Q filter solutions.

Therefore, there is a need to design more robust and efficient packaging solutions for integrated subarray and array antennas in wireless communication links to handle the future demands on the increasing data traffic and optimum antenna deployment in high performance wireless communication systems.

SUMMARY

It is an object of the present disclosure to set forth an integrated antenna unit assembly, and integrated antenna packages for addressing at least some of the shortcomings in the current packaging of integrated antenna arrays as discussed above.

These objects are achieved by means of several aspects of the present invention defined in the appended claims.

According to a first aspect of the present disclosure, there is provided an integrated antenna unit assembly comprising a carrier structure, one or more antenna element(s) arranged on a surface of a first edge part of the carrier structure. The integrated antenna unit assembly further comprises an integrated circuit (IC) arrangement comprising one or more circuits mounted on a first surface of a first side of the carrier structure. Further, a first dielectric element mounted on a second surface of the first side of the carrier structure and coupling means arranged to electrically couple the IC to the first dielectric element are also comprised in the integrated antenna unit assembly. The carrier structure of the integrated antenna unit assembly comprises a second edge part, opposite to the first edge part, which is adapted to be surface-mounted on a surface of a second dielectric element.

Accordingly, several advantages are provided by the solutions and embodiments of the present disclosure, namely by the inventive integrated antenna unit assembly, providing the possibility of implementation of highly integrated, highly-compact active antenna arrays which alleviate the requirements of the space required for massive antenna sub-arrays and antenna arrays e.g. in the future 6G networks demanding high frequency components operational at frequencies around 100 GHz. This in turn, demands the downsizing in the physical dimensions of the components. By using the edges of the antenna unit assembly and antenna packages comprising the antenna unit assemblies according to the invention as the place of the antenna elements and considering the size of an IC, the required space for arrays operating on high frequencies is thus provided. Simultaneously, by using material with high thermal conductivity, requirements of efficient heat transfer are also met for the integrated antenna unit assembly and implementation of antenna packages according to the invention.

In some embodiments, the first edge part of the carrier substate may be arranged substantially parallel or with a slanted orientation with respect to the second edge part. This provides for more freedom to design antenna arrays and integrated packages designed according to the geometries of the installation space.

In several example embodiments, the carrier structure of each antenna unit assembly, or of at least some of the antenna unit assemblies in an antenna array or in an antenna package may comprise one or more filter element(s) coupled to the one or more antenna element(s) and the IC. The filter elements are adapted to filter the received and/or transmitted signals at and/or from the one or more antenna element(s).

According to some other embodiments, the one or more filter element(s) are integrated into the carrier structure and comprise at least one waveguide and/or stripline structure formed inside the carrier structure. In several embodiments, each filter element can be coupled to the one or more antenna element(s) and to the IC via a coupling line which can be any one of a waveguide and a stripline and a coaxial connection or any combination of these coupling means.

In various embodiments, the carrier structure may be made of a thermally conductive material which allows the carrier structure to function as a heat-spreader as well.

The solution according to the invention could be used to achieve antenna arrays with high density antenna element spacing which mitigate grating lobes that reduce the signal to inference level in the networks. The solution according to the invention will also enable the integration of filter elements in the integrated unit assemblies and antenna packages while maintaining good cooling as the distances between IC and heat spreader (the carrier structure and heat-sink element(s)) will be short and made of material with high thermal conductivity. As a great degree of the integration is made inside the package comprising distribution/coupling networks, antenna elements and filter elements, the complexity of routing on PCBs will be reduced significantly.

According to a second aspect of the present disclosure, there is provided an integrated antenna package comprising a carrier structure, and one or more antenna element(s) arranged on a surface of a first edge part of the carrier structure. Further, the package comprises an integrated circuit (IC) arrangement comprising one or more circuits, mounted on a first surface of a first side of the carrier structure and a first dielectric element mounted on a second surface of the first side of the carrier structure. Further the package comprises coupling means arranged to electrically couple the IC to the first dielectric element as well as a second dielectric element having at least one opening adapted to receive a heat-sink element thereto. Thus, the heat-sink element is integrated into the second dielectric element. The package also comprises coupling means arranged to electrically couple the first dielectric element to the second dielectric element, wherein the carrier structure comprises a second edge part adapted to be surface-mounted on a first surface of the second dielectric element such that the carrier structure is arranged upright on the first surface of the second dielectric element, and wherein the second edge part of the carrier structure is at least partly in thermal contact with the heat-sink element.

According to a third aspect of the present disclosure, there is provided an integrated antenna package comprising a plurality of integrated antenna unit assemblies according to the first aspect of the invention, and a second dielectric element having at least one opening, each opening being associated with at least one antenna unit assembly and adapted to receive a heat-sink element thereto, such that the heat-sink element is integrated into the second dielectric element. The second edge part of the carrier structure of each of the at least one integrated antenna unit assemblies is adapted to be surface-mounted on a first surface of the second dielectric element such that each of the carrier structures of the antenna unit assemblies is arranged upright on the first surface of the second dielectric element. The second edge part of the carrier structure of each antenna unit assembly is at least partly in thermal contact with the heat-sink element comprised in each opening associated with that antenna unit assembly.

Accordingly, the features, functionalities and advantages achieved by the first aspect of the present disclosure analogously apply to the second and third aspects of the present disclosure.

DETAILED DESCRIPTION

Figure 1A:
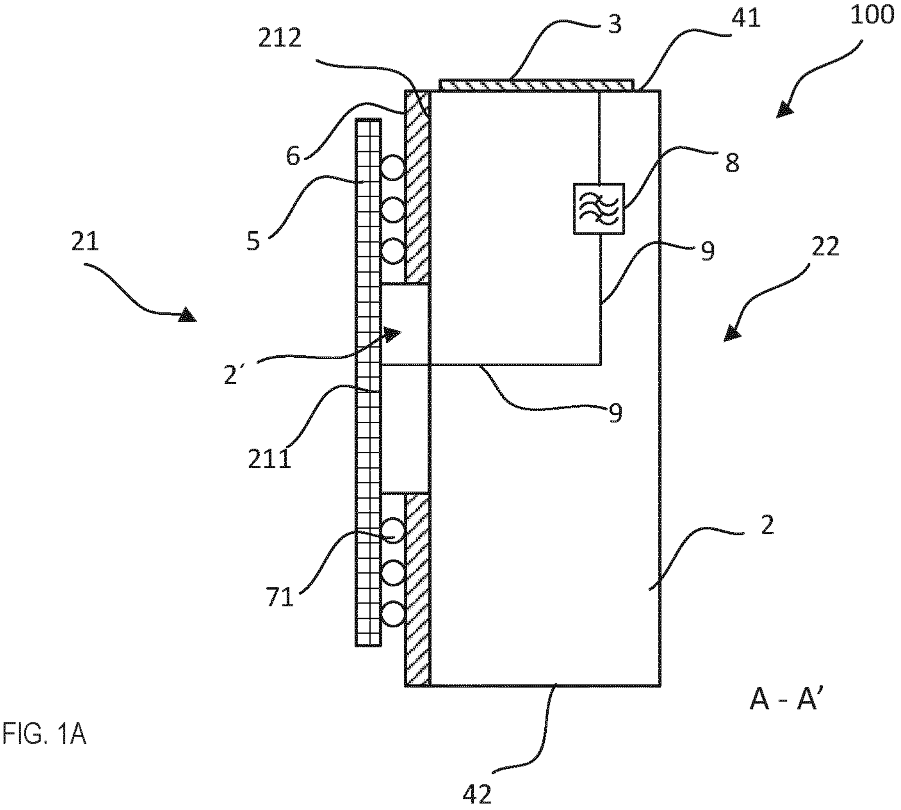
FIG. 1A shows a schematic cross-sectional side view of an antenna unit assembly according to some embodiments of the present disclosure.

Aspects and various embodiments of the present disclosure will now be described more fully hereinafter with reference to the accompanying drawings. The different devices, and systems disclosed herein can, however, be realized in many different forms and should not be construed as being limited to the aspects and embodiments set forth herein. Like numbers in the drawings refer to like elements throughout. Figures are not to scale, and different elements and components may have different sizes and dimensions than what is illustrated.

Figure 1B:
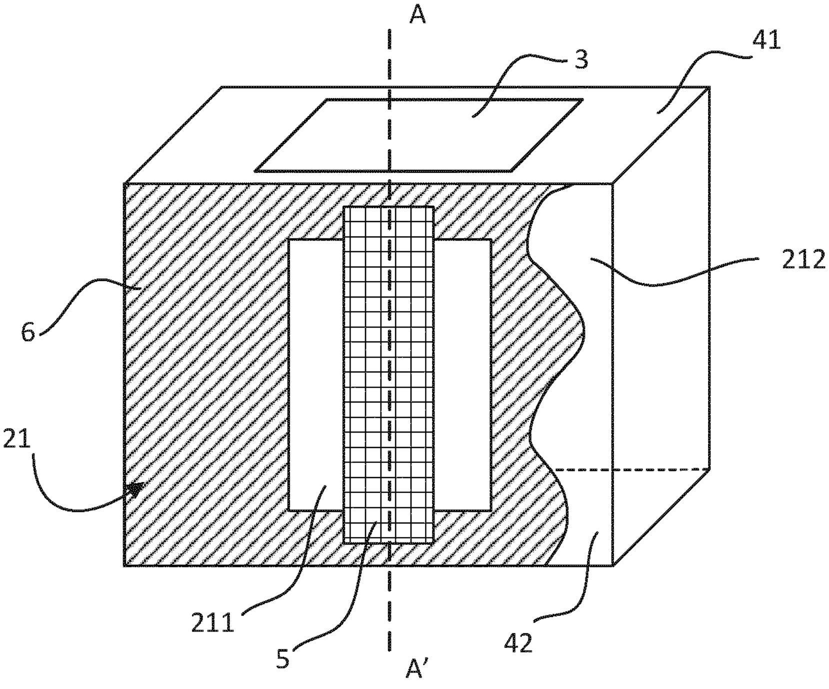
FIG. 1B shows a schematic perspective view of one side of the antenna unit assembly of FIG. 1A according to some other embodiments of the present disclosure.
Figure 1C:
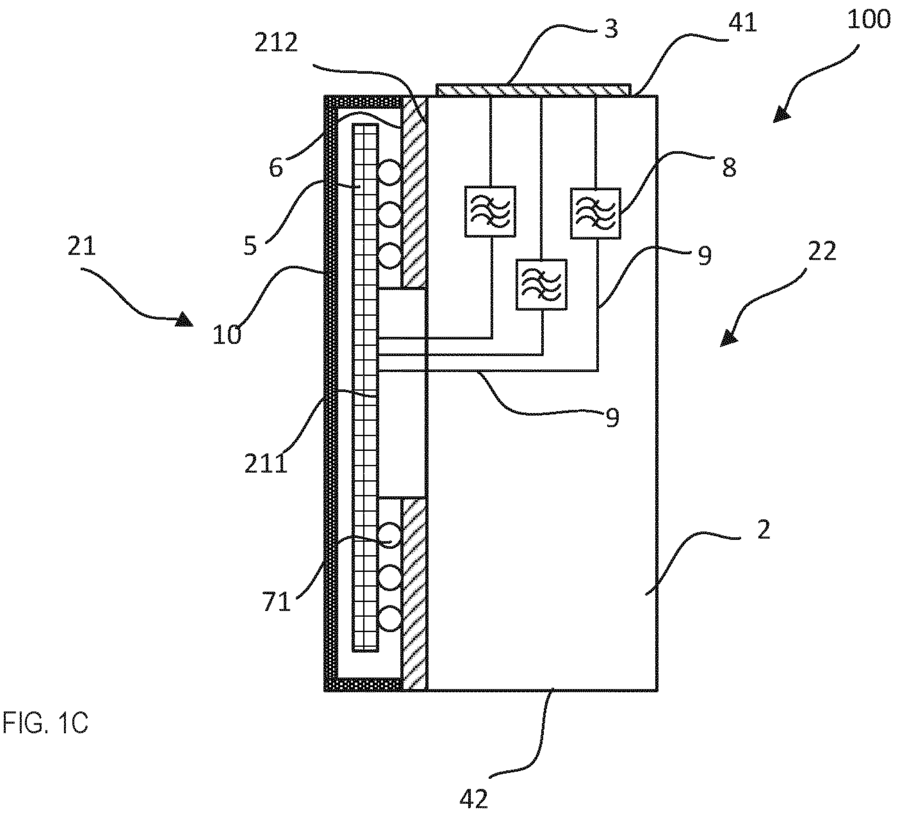
FIG. 1C illustrates a schematic cross-sectional side view of the antenna unit assembly according to some other embodiments of the present disclosure.

FIG. 1 shows an antenna unit assembly 100 according to several embodiments of the present disclosure. With reference to FIG. 1A, this figure illustrates a cross-sectional side view of the antenna unit assembly 100 of FIG. 1B. The cross-section in FIG. 1A is taken along the longitudinal extension A-A". FIG. 1B, shows a front view of the antenna unit assembly of FIG. 1A, seen from a first side 21 of the antenna unit assembly 100.

The antenna unit assembly in various embodiments and examples of the present disclosure, including the embodiments of FIGS. 1A-B is an integrated antenna unit assembly 100. By integrated it is to be construed that several components are joined together with the antenna elements 3, in the assembly 100. Several components include e.g. integrated circuits, cooling elements, filter units, radio frequency (RF) and direct current (DC) signal routing arrangements, etc. which will be explained and relationships between the components described in detail according to several examples and embodiments in the following disclosure.

The integrated antenna unit assembly 100 comprises a carrier structure 2, one or more antenna element(s) 3 arranged on a surface of a first edge part 41 of the carrier structure 2. The antenna elements 3, can be only one, or more than one e.g. two, three, four or more antenna elements mounted on the first edge part 41. Each antenna unit assembly 100, may be a part of an antenna sub-array which in turn may form an antenna array structure such a multi-input, multi-output (MIMO) array or a massive-MIMO array. The antenna sub-arrays may be active antenna sub-arrays or passive antenna sub-arrays. In the embodiments of the present disclosure, when not explicitly stated, the antennas are considered to be active antennas, wherein antenna elements comprise and/or are coupled to active circuitry. In several embodiments, the first edge part 41 of the carrier substate is arranged substantially parallel with respect to the second edge part 42. In some other embodiments, the first edge part 41 of the carrier substate is arranged with a slanted orientation with respect to the second edge part 42. This means that the first edge part 41 can be arranged at any suitable angle with respect to the second edge part 42 of the carrier structure as shown e.g. in FIGS. 1A-1C and FIG. 6.

The carrier structure 2, in the embodiments of the present disclosure is made of a material with a high thermal conductivity. Examples of such materials is metal, more preferably copper or stainless steel. The carrier structure 2, further comprises a second edge part 42, which is arranged opposite to the first edge part 41 and is adapted to be surface-mounted on a surface of a second dielectric element 11 (see FIG. 2).

The antenna unit assembly 100 further comprises an integrated circuit, IC, arrangement 5, comprising one or more circuits (not shown).

The IC arrangement 5 may comprise one or more active and/or passive circuits in general, e.g. one or more RF circuits, particularly one or more millimetre wave circuits or sub-millimetre wave circuits or one or more active MMICs (Monolithic Microwave Integrated Circuit) and multiple circuit-to-waveguide transitions for one and the same circuit arrangement, or MMIC.

The IC arrangement 5, is adapted to be mounted on a first surface 211 of the first side 21 of the carrier structure, or also referred to as the first side 21 of the antenna unit assembly 100.

The antenna unit assembly 100 further comprises a first dielectric element 6 which is arranged and mounted on a second surface 212 of the first side 21 of the carrier structure 21. As shown in FIG. 1B, the dielectric element 6 may be a continuous dielectric layer 6 deposited on the second surface 212 as the hatched part 6 shown in FIG. 1B. However, the continuous first dielectric layer 6 is not extended over the first surface 211 of the first side 21. In various embodiments, the dielectric element 6 is arranged to circumvent i.e. surround the first surface 211. Referring to FIG. 1A, the part 2' of the carrier structure 2, which comprises the first surface 211, has a raised surface profile relative to the other part of the carrier structure, where the first dielectric element is mounted. In other words, the part 2' forms a mesa structure having an elevated height with respect to the other part of the first side 21 of the carrier structure, onto which the first dielectric element 6 is deposited. The mesa 2' can be formed with any well-known process in the art, such as surface machining. The IC arrangement 5, is adapted to be mounted on the first surface 211 of the mesa 2' of the first side 21 of the carrier structure 2.

The IC arrangement 5, can be mounted on the mesa 2' by any well-known processes in the art such as soldering or conductive glue.

The antenna unit assembly 100 further comprises coupling means 71, which are arranged to electrically couple the IC arrangement 5 to the first dielectric element 6. The coupling means are arranged to electrically couple the IC to the first dielectric element and in different embodiments, comprise any one of metallic solder pads and conductive glue pads, and wire-bonding from the IC to the first dielectric element. In FIG. 1A, the IC is electrically and physically connected to the first dielectric material 6 via spherical solder bumps 71, wherein the circular cross-sectional side view is visible. By means of the one or more coupling means e.g. solder bumps 71, DC current supply to the IC arrangement 5 can be provided. Further, control signals and/or data signals to and/or from the IC 5 can be sent and received.

One of the main advantages of having the carrier structure 2, made from metal with high thermal conductivity is that the whole carrier structure including the second side 22 of the carrier structure perform as a heat spreader structure which transfers the generated heat in the IC 5 and other components of the antenna unit assembly 100 out of the integrated unit 100.

In other various embodiments such as the embodiment in FIG. 1A, the antenna unit assembly 100 comprises at least one filter element 8. In several embodiments, the antenna unit assembly 100 comprises more than one, e.g. two, three, four or a plurality of filter elements 8 depending on the intended applications, frequencies, and system design requirements.

The filter elements in several embodiments are preferably comprised in the carrier structure 2. The one or more filter elements 8 are adapted to be coupled to the one or more antenna element(s) 3 and the IC arrangement 5. The filter elements 8 are adapted to filter the received and/or transmitted signals at and/or from the one or more antenna element(s). The one or more filter element(s) are in various embodiments such as FIG. 1A, integrated into the carrier structure 2 and comprise at least one waveguide and/or stripline structure formed inside the carrier structure. The carrier structure 2, can be constructed by stacking layers of metal plates on top of each other, in a layer-by-layer arrangement. The metal sheets/plates can be laminated by bonding together. In this way the filter elements comprising customized waveguides and stripline structures can be formed within the carrier structure 2. The carrier structure 2 can also be constructed by other processes known in the art such as 3D printing or layer deposition techniques. In several embodiments of the present disclosure, each filter element is arranged to be coupled to the one or more antenna element(s) 3 and to the IC arrangement 5 via a coupling line 9, wherein the coupling line is any one of a waveguide 9 and a stripline 9 and a coaxial connection 9 as shown in FIG. 1A.

The antenna elements 3, can be any suitable antenna structures e.g. in the form of horn antennas, patch antennas, dipoles, stacked antenna structures, slot antennas, single polarized or dual polarized antenna structures and the like.

In several embodiments, the antenna unit assembly 100 further comprises a cover lid 10, as shown in FIG. 10. The cover lid 10 is arranged to cover at least the IC arrangement 5 and the first dielectric element 6. The cover lid is preferably made of any one of plastic and ceramic and metal. The cover lid protects the antenna unit and the IC and the other electrical components from mechanical, or chemical damages imposed by the surrounding environment and prevents leakage of water or dust into the units.

Figure 2:
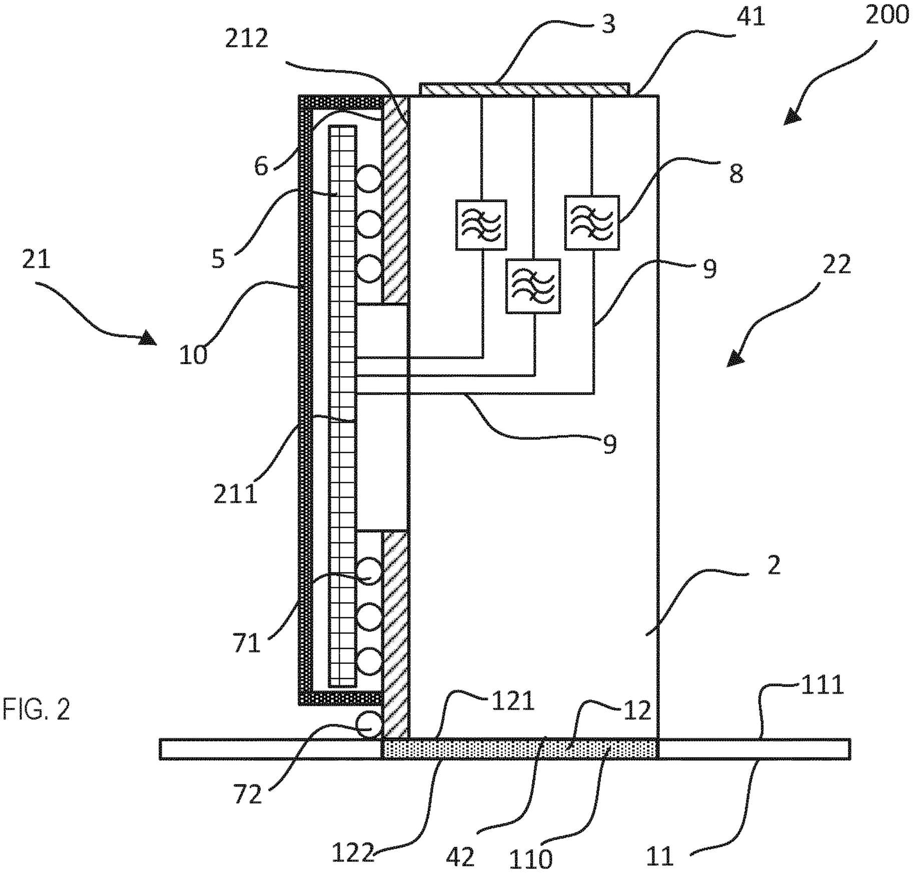
FIG. 2 illustrates a schematic cross-sectional side view of an integrated antenna package according to some embodiments of the present disclosure.

FIG. 2 illustrates an integrated antenna package 200, according to several embodiments of the present disclosure. The integrated antenna package 200 in FIG. 2 comprises at least one integrated antenna unit assembly 100 as explained with respect to any of FIGS. 1A, 1B or 10.

The integrated antenna package 200 further comprises a second dielectric element 11 having at least one opening 110 adapted to receive a heat-sink element 12 thereto, such that the heat-sink element is integrated into the second dielectric element 11. In various embodiments and aspects, the second dielectric element is a printed circuit board (PCB) structure. The second edge part 42 of the carrier structure 2 is adapted to be surface-mounted on a first surface 111 of the second dielectric element 11 such that the carrier structure is arranged upright on the first surface of the second dielectric element. The second edge part of the carrier structure 42 is at least partly in physical and thermal contact with the heat-sink element. In some other embodiments, the carrier structure can be mounted onto the first surface i.e. top surface of the second dielectric layer e.g. the PCB, in any other angle other than upright or substantially vertical angle. Evidently, such upright mounting comprises the normal tolerances due to the mounting process and is not restricted to an exact 90 degrees mounting angle between the carrier structure and the second dielectric material meaning that the carrier structure may be mounted at slightly smaller or larger angle than the absolute vertical, of which the skilled person is aware.

In some other examples the mounting angle can be any suitable angle between the carrier structure and the second dielectric element wherein when mounted, the carrier structure is not in the same plane or in a parallel plane as the second dielectric element. In other words, the carrier structure when mounted, protrudes out of the horizontal plane of the second dielectric element when the second dielectric element is arranged substantially horizontally.

Figure 6:
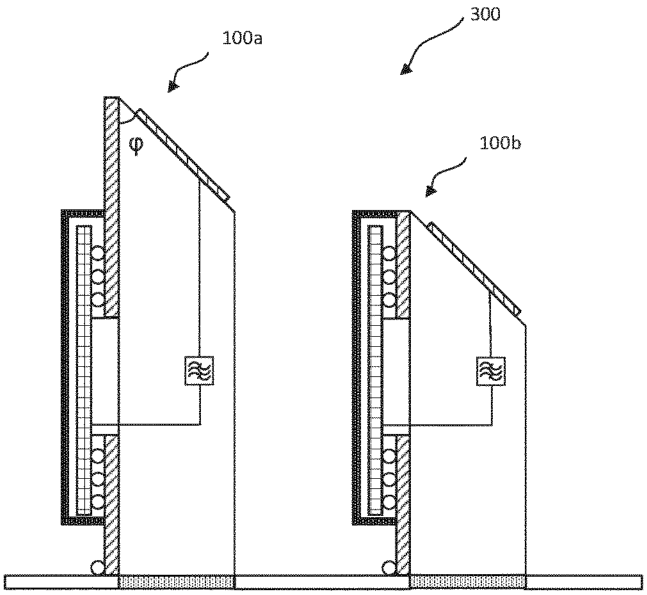
FIG. 6 shows a schematic cross-sectional side view of an integrated antenna package according to some embodiments of the present disclosure.

In several embodiments, the antenna unit assembly as a whole is also mounted upright when the carrier structure is mounted upright on the surface of the second dielectric element i.e. following the angle of mounting of the carrier structure. It should also be clear that some components of the antenna unit assembly may be arranged parallel or in any other angle with respect to the second dielectric material even when the carrier structure is mounted upright. For instance, one or more of the antenna elements mounted on the carrier structure may be arranged substantially parallel or at an angle with respect to the second dielectric material as shown for example as shown in FIG. 6.

According to several embodiments, the heat-sink element 12 has a first surface 121 and a second surface 122, wherein the first surface i.e. the top surface of the heat-sink element is arranged to face, and at least partly be in thermal contact with the second edge part 42 of the carrier structure. The second surface of the heat-sink element i.e. the bottom surface of the heat-sink element is arranged to face away from the second edge part of the carrier structure. In various embodiments, the second surface of the heat-sink could at least partly be connected to external mechanical parts and equipment such as metallic fins and plates to further transfer the heat away from the package (not shown) and/or directly be exposed to ambient air or other cooling medium/equipment (not shown). In several embodiments, the heat-sink element is a metallic coin integrated into the second dielectric element 11, or a via farm type of heat-sink. The attachment of the carrier structure to the top surface of the heat-sink element(s) could be made by means of soldering, such that no air gap is present between the two surfaces to ensure optimal physical and thermal connection and heat transfer. In some examples, the space between the two surfaces can be filled with a gap-filler which is also highly thermally conductive to ensure the proper thermal interface. The heat-sink element(s) are made of a metal with high thermal conductivity such as copper.

The integrated coin is a metal insert in a PCB, a piece of solid metal that is attached to an IC for cooling purposes. A via farm is a number of via holes close to each other with the function to cool and/or shield the IC. When the heat-sink element is an integrated coin and/or a via farm, the top and bottom surface is to be construed as bondable metal pad at least partly in thermal contact with the carrier structure.

The integrated antenna package 200 further comprises coupling means 72 arranged to electrically couple the first dielectric element 6 to the second dielectric element 11. The coupling means or conductors are arranged for routing of DC power and/or control and data signals from the first dielectric element to the second dielectric element and vice versa. The coupling means in this case can also be any one of metallic solder pads, solder bumps and conductive glue pads, and wire-bonding. The second dielectric element is also connected to other circuitry (not shown) to form and ensure the functionality of the entire package. The antenna package may also be referred to as a radio unit, since it comprises the components of an integrated radio unit with active antenna sub-arrays or antenna arrays.

As mentioned earlier with reference to FIG. 1A, the antenna element(s) 3 in the antenna package 200 of FIG. 2 are also any suitable antenna structures e.g. in the form of horn antennas, patch antennas, dipoles, stacked antenna structures, slot antennas, single polarized or dual polarized antenna structures and the like. This has been further illustrated with reference to FIG. 3A-H.

Figure 3A:
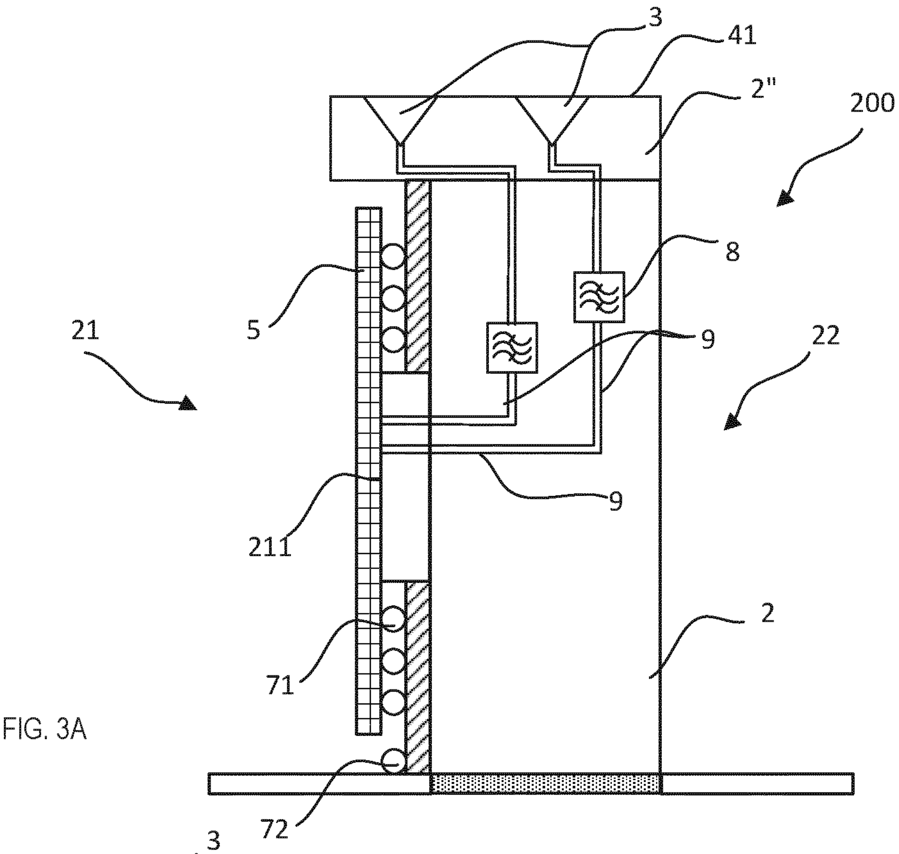
FIG. 3A shows a schematic cross-sectional side view of an integrated antenna package according to some embodiments of the present disclosure.
Figure 3B:
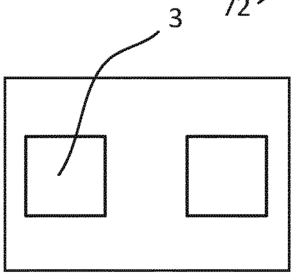
FIGS. 3B-3H show schematic top views of various antenna elements, antenna sub-arrays and antenna arrays according to some embodiments of the present disclosure.
Figure 3C:
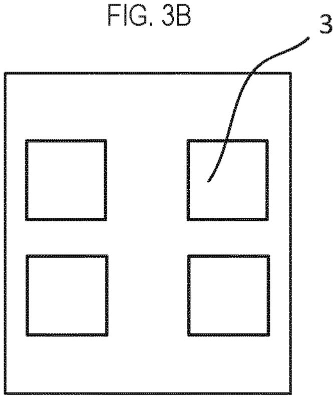

FIG. 3A shows a cross-sectional side view of the integrated antenna package 200 without the cover lid. However, this also can be implemented similarly for the embodiments where the antenna unit assembly comprises a cover lid. Here, as a mere example, the antenna unit assembly comprises two horn antennas 3 mounted on the first edge 41 of the carrier structure similar to the embodiments of FIGS. 1A-B and FIG. 2. Even though in FIG. 3, the top part 2" of the carrier structure 2 is illustrated as being extended in the horizontal and vertical directions somewhat larger than the main body of the carrier structure, to accommodate the horn antennas. This top part may be a separate piece of metal or be a part of the main body of the carrier structure wherein the horn antennas are formed in, with their radiating part arranged on the first edge part 41. In general, the antenna elements can be suitably mounted on the first edge part of the carrier structure in any known manner in the art. In this example in FIG. 3A, only two horn antennas are shown, however, there could be only one horn antenna element comprised in the antenna unit assembly. In several other embodiments, there could be a plurality of horn antennas mounted onto the first edge part 41. This similarly applies for any other antenna type e.g. patch antennas or slot antennas. FIG. 3B shows a top view of the two horn antenna elements in FIG. 3A. A stated above, any number of antenna sub-arrays can be formed by mounting the desired number of antenna elements, e.g. as shown in FIG. 3C in which the sub-array comprises four horn antenna elements and the sub-array in FIG. 3E comprises eight antenna elements 3.

Figure 3D:
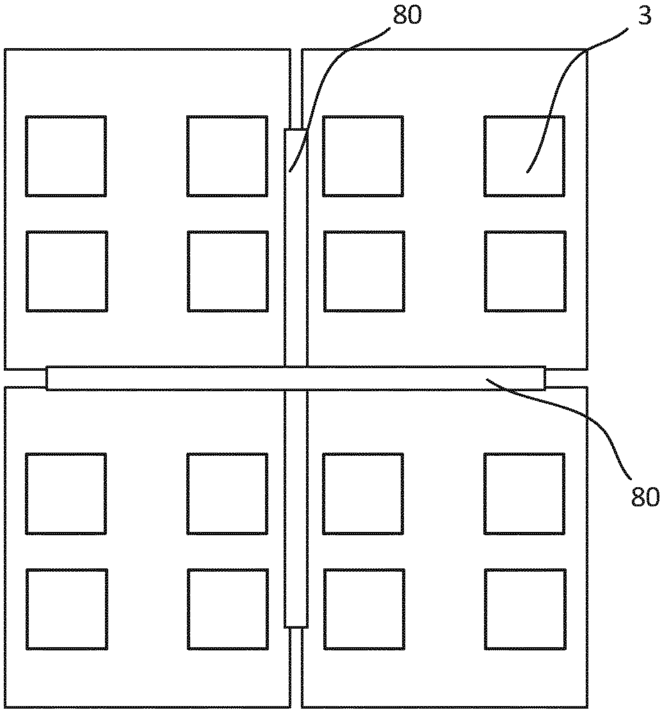
Figure 3E:
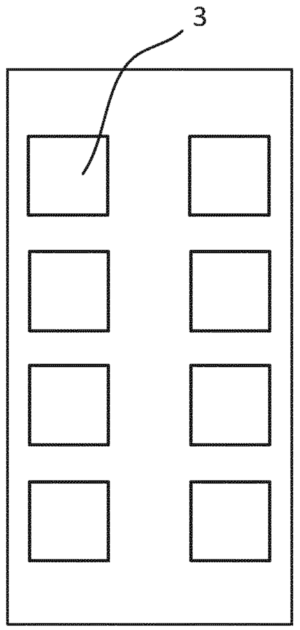
Figure 3F:
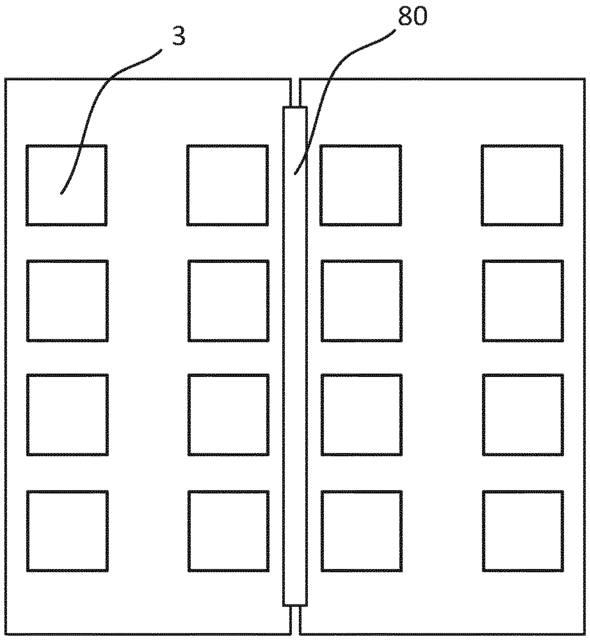
Figure 3G:
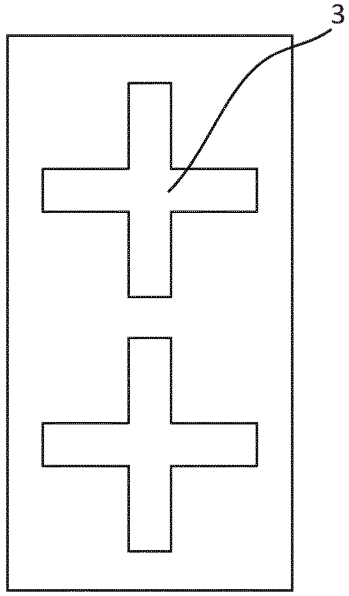
Figure 3H:
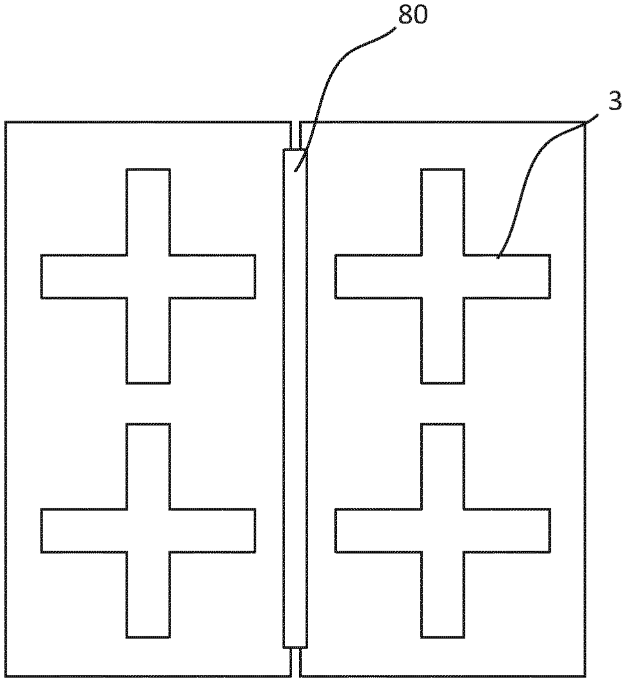
Figure 5:
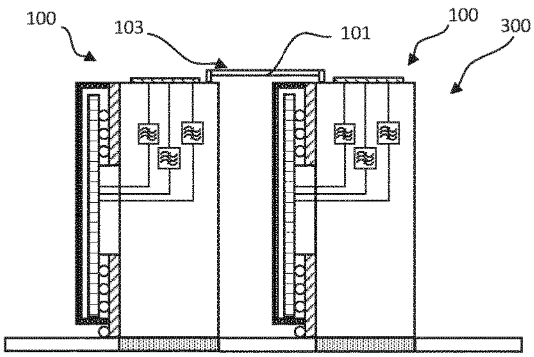
FIG. 5 illustrates a schematic cross-sectional side view of an integrated antenna package according to some embodiments of the present disclosure.

Sub-arrays of different dimensions can be joined together in any manner suitable, to form antenna arrays of different dimension according to many embodiments as for example depicted in FIG. 3D and FIG. 3F. The sub-arrays can be joined by coupling elements 80 to form the antenna array arrangements. In other embodiments, other types of antenna elements can be appropriately implements such as dual-polarized cross-shaped slot antenna elements as shown in FIG. 3G (top view). Similarly, such antenna elements can be implemented to form antenna sub-arrays and antenna sub-arrays joined to form antenna array arrangements of various dimensions as shown e.g. in FIG. 3H (top view). Other variations and implementations than the mere examples shown here are readily available to the skilled person. In yet another embodiment shown in FIG. 5, the antenna unit assemblies are arranged to be connected to each other via the top edge part 41. This way, sub-array antennas can be connected by means of at least one galvanic connection 101 to adjacent sub-array antennas to form a common ground plane 103 without any gaps in the ground plane of the antenna array. These gaps, if present due to e.g. mounting defects of the antenna unit assemblies and sub-arrays can create negative impacts on the performance of the whole antenna package.

Figure 4A:
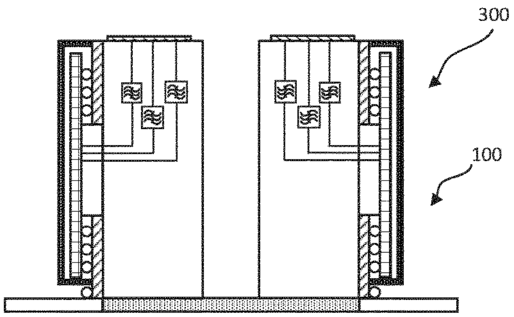
FIGS. 4A-4C illustrate schematic cross-sectional side views of integrated antenna packages according to several embodiments of the present disclosure.
Figure 4B:
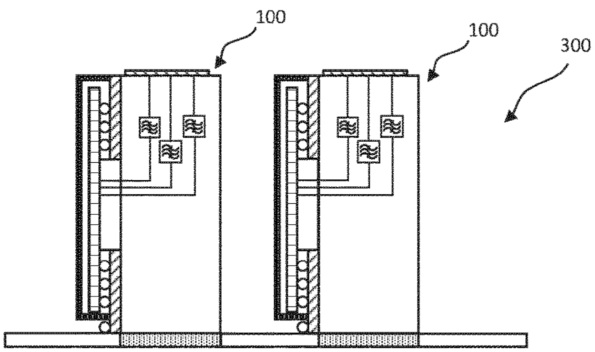
Figure 4C:
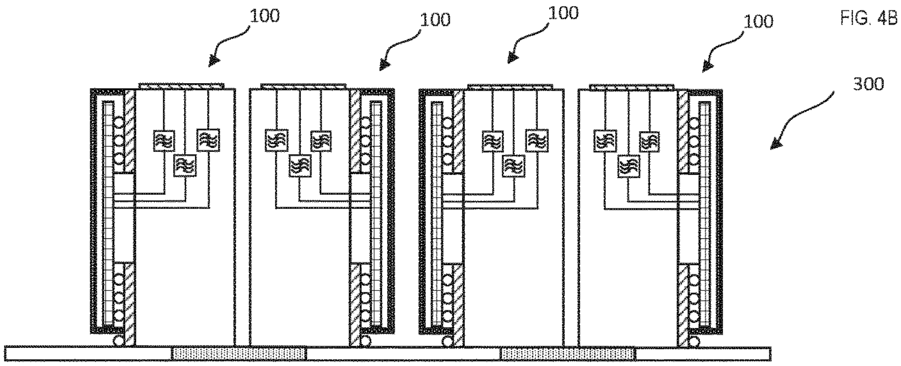

FIG. 4A-C shows various embodiments according to the present invention, wherein multiple antenna unit assemblies are implemented to form integrated antenna packages. The sub-arrays and integrated antenna arrays can be implemented based on the desired application by incorporating the required components such as specific antenna elements, specific filter elements adapted for the desired RF frequencies, as well as variations in the number and types of filter elements. FIG. 4A shows an example where an integrated antenna package 300 comprises an antenna sub-array formed by two antenna unit assemblies 100. In various embodiments three, four, eight, sixteen or any number of antenna unit assemblies and antenna subarrays can be implemented in the integrated antenna package 300. In the example of FIG. 4A, the heat-sink element 12 is shared between the two antenna unit assemblies. The heat-sink element can be an integrated coin heat-sink, such that each of the antenna unit assemblies have a thermal interface to the same heat-sink element. In other words, the second edge part 42 of each antenna unit assembly is in physical and thermal connection with the same heat-sink element. This way the number of heat-sink elements used in each integrated antenna package can be reduced.

In various other embodiments, as shown in the example of FIG. 4B, each integrated antenna unit assembly 100 is associated with a designated heat-sink element. In other word, each heat-sink unit comprised in the second dielectric element is in thermal connection and has a thermal interface to each related carrier structure i.e. coupled to the second edge part of each carrier structure in physical and thermal connection with that heat-sink element. Similarly, the number and type of components, antenna elements, dimensions of the sub-arrays and antenna arrays are decided as a design parameter.

In a different example, several embodiments of the integrated antenna package 300 may comprise antenna unit assemblies 100 wherein the carrier structure of each unit is at least partly in physical and/or thermal connection with each associated heat-sink element. As shown in FIG. 4C, only a part of the second edge part 42 of each carrier structure 2 is thermal interfaced with a related heat-sink element 12. This arrangement also allows for reducing space in the antenna package and form denser arrays. Similar to the previous embodiments, a plurality of antenna sub-arrays and components as desired. Different types of heatsink element such a integrated coin or via farms can be implemented for any of the above-explained embodiments and examples.

In FIG. 6 another embodiment is illustrated, wherein the carrier structure of at least one integrated antenna unit assembly has a slanted first edge part 41. More or all the sub-arrays may also have such a slanted i.e. angled first edge part. The angle can be any suitable angle φ e.g. 30 or 45 or 60 degrees with respect to the first side 21 of the carrier structure or the IC arrangement, which in this example are arranged substantially vertically. This provides for further freedom in design of various radiation patterns from the antenna elements and antenna sub-arrays, wherein the antenna elements are arranged on the carrier structure also at the same angle φ of the first edge part 41. In some embodiments, the height (vertical extension) of the carrier structure 2, of the antenna unit assemblies or the height of the antenna unit assemblies as a whole may be adjusted to provide for a full exposure of the antenna elements of each antenna unit assembly such that blocking of the slanted antenna elements of each antenna unit assembly by the adjacent antenna unit assembly is avoided. In other words, and as shown in FIG. 6, the height of the antenna unit assembly 100*a* is larger than the height of the adjacent antenna unit assembly 100*b*.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfil the functions of several items recited in the claims. The mere fact that certain measures are recited in mutually different dependent claims does not indicate that a combination of these measures cannot be used to advantage. The combination of features shown in the figures impose no limitations to the skilled person, and other conceivable combinations should be appreciated to be available to the skilled person without departing from the scope of the claims. For example, when several antenna assembly units are used, not all units need to have protective lid covers, one or more filter elements, nor dedicated heat-sink elements. Some antenna units in the package may share common heatsink elements, some antenna assembly units may comprise one or more filter units, some antenna assembly units may be implemented without the lid cover. Connections among the various components may be combination of available connection and coupling methods and means such as combination of waveguides, striplines, coaxial lines, etc as desired by the design requirements. Any reference signs in the claims should not be construed as limiting the scope.

The invention claimed is:

1. An integrated antenna unit assembly comprising:

a carrier structure, wherein the carrier structure is made of a thermally conductive material;

one or more antenna element(s) arranged on a surface of a first edge part of the carrier structure;

an integrated circuit, IC, arrangement comprising one or more circuits, mounted on a first surface of a first side of the carrier structure;

a first dielectric element mounted on a second surface of the first side of the carrier structure;

coupling means arranged to electrically couple said IC to said first dielectric element; wherein the carrier structure comprises a second edge part, opposite to the first edge part adapted to be surface-mounted on a surface of a second dielectric element.

2. The integrated antenna unit assembly according to claim 1, wherein the first edge part of the carrier substate is arranged substantially parallel or with a slanted orientation with respect to the second edge part.

3. The integrated antenna unit assembly according to claim 1, wherein said coupling means arranged to electrically couple said IC to said first dielectric element comprises any one of metallic solder pads and conductive glue pads, and wire-bonding from the IC to the first dielectric element.

4. The integrated antenna unit assembly according to claim 1, wherein the carrier structure comprises one or more filter element(s), coupled to the one or more antenna element (s) and said IC and adapted to filter the received and/or transmitted signals at and/or from the one or more antenna element(s).

5. The integrated antenna unit assembly according to claim 4, wherein the one or more filter element(s) are integrated into the carrier structure and comprise at least one waveguide and/or stripline structure formed inside the carrier structure.

6. The integrated antenna unit assembly according to claim 4, wherein each filter element is coupled to the one or more antenna element(s) and to the IC via a coupling line, said coupling line being any one of a waveguide and a stripline and a coaxial connection.

7. The integrated antenna unit assembly according to claim 1, wherein the antenna unit assembly further comprises a cover lid arranged to cover the IC and the first dielectric element.

8. The integrated antenna unit assembly according to claim 7, wherein the cover lid is made of any one of plastic and ceramic and metal.

9. An integrated antenna package comprising:

a plurality of integrated antenna unit assemblies of claim 1; and a second dielectric element having at least one opening, each opening being associated with at least one antenna unit assembly and adapted to receive a heat-sink element thereto, such that the heat-sink element is integrated into the second dielectric element;

wherein the second edge part of the carrier structure of each of the at least one integrated antenna unit assemblies is adapted to be surface-mounted on a first surface of the second dielectric element such that each of the carrier structures of the antenna unit assemblies is arranged upright on the first surface of the second dielectric element, and wherein the second edge part of the carrier structure of each antenna unit assembly is at least partly in thermal contact with said heat-sink element comprised in each opening associated with that antenna unit assembly.

10. The integrated antenna package according to claim 9, wherein the first edge part of one antenna unit assembly is arranged to be in galvanic connection with the first edge part of at least one other antenna unit assembly.

11. An integrated antenna package comprising:

a carrier structure, wherein the carrier structure is made of a thermally conductive material;

one or more antenna element(s) arranged on a surface of a first edge part of the carrier structure;

an integrated circuit, IC, arrangement comprising one or more circuits, mounted on a first surface of a first side of the carrier structure;

a first dielectric element mounted on a second surface of the first side of the carrier structure;

coupling means arranged to electrically couple said IC to said first dielectric element;

a second dielectric element having at least one opening adapted to receive a heat-sink element thereto, such that the heat-sink element is integrated into the second dielectric element;

a second coupling means arranged to electrically couple said first dielectric element to said second dielectric element;

wherein the carrier structure comprises a second edge part adapted to be surface-mounted on a first surface of the second dielectric element such that the carrier structure is arranged upright on the first surface of the second dielectric element, and wherein the second edge part of the carrier structure is at least partly in thermal contact with said heat-sink element.

12. The integrated antenna package according to claim 11, wherein said heat-sink element has a first surface and a second surface, wherein the first surface of the heat-sink element is arranged to face, and at least partly be in thermal contact with the second edge part of the carrier structure, and wherein the second surface of the heat-sink element is arranged to face away from the second edge part of the carrier structure.

13. The integrated antenna package according to claim 11, wherein said heat-sink element is a metallic coin or a via farm type of heat-sink.

* * * * *